(12) United States Patent
Zhang et al.

(10) Patent No.: US 8,091,251 B1
(45) Date of Patent: Jan. 10, 2012

(54) HIGH-SPEED MEASURING ELECTRONIC DIGITAL OUTSIDE MICROMETER

(76) Inventors: Yanchen Zhang, San Clemente, CA (US); Rene Roland Laferriere, Marlborough, MA (US)

( * ) Notice: Subject to any disclaimer, the term of this patent is extended or adjusted under 35 U.S.C. 154(b) by 0 days.

(21) Appl. No.: 12/945,884

(22) Filed: Nov. 14, 2010

Related U.S. Application Data

(60) Provisional application No. 61/263,397, filed on Nov. 22, 2009.

(51) Int. Cl.
*G01B 5/02* (2006.01)
(52) U.S. Cl. ............... 33/819; 33/821; 33/831
(58) Field of Classification Search ........ 33/813, 33/814, 819, 821, 825, 831
See application file for complete search history.

(56) References Cited

U.S. PATENT DOCUMENTS

| | | | |
|---|---|---|---|
| 4,561,185 A * | 12/1985 | Sakata et al. ............. | 33/819 |
| 6,463,671 B1 * | 10/2002 | Saeki .................... | 33/831 |
| 7,467,480 B2 * | 12/2008 | Hayashida et al. ......... | 33/813 |
| 7,552,544 B2 * | 6/2009 | Hayashida et al. ......... | 33/831 |
| 2006/0156567 A1 * | 7/2006 | Lee ..................... | 33/568 |
| 2007/0214675 A1 * | 9/2007 | Weissinger .............. | 33/813 |
| 2009/0282689 A1 * | 11/2009 | Hayashida et al. ......... | 33/819 |
| 2010/0024237 A1 * | 2/2010 | Hayashida et al. ......... | 33/831 |

* cited by examiner

*Primary Examiner* — G. Bradley Bennett
(74) *Attorney, Agent, or Firm* — Let Z. Kwan, Esq.

(57) ABSTRACT

A high-speed measuring electronic digital outside micrometer allowing a user to make measurements quickly and effectively compared to conventional electronic outside micrometers with rotary thread spindles, which have limited measuring speed. This high-speed measuring electronic digital outside micrometer features: a linear motion digital sensor, a linear scale digital sensor, a linear motion digital sensor base, a digital display unit, an electronic processing unit, a micrometer body, a linear spindle, a linear spindle movement unit, a spindle control unit, a micrometer anvil, and retractable springs. In a stationary position, the measuring surface of the micrometer anvil and the linear spindle are in contact to the other. By operating the spindle control unit, it will create distance between the micrometer anvil and the linear spindle measuring surface. This distance is a measurable distance of the micrometer. By set free of the spindle control unit, the retractable springs will re-set the micrometer to its stationary position.

10 Claims, 1 Drawing Sheet

HIGH-SPEED MEASURING ELECTRONIC DIGITAL OUTSIDE MICROMETER

PRIORITY DATE

Applicant claims priority date of Nov. 22, 2009 based on provisional 61/263,397 filed Nov. 22, 2009.

BACKGROUND OF THE INVENTION

1. Field of the Invention

The present invention relates generally to tools of precision measurement, and more particularly to an outside micrometer which accurately and precisely measures either the length, the width, the height, or the diameter of an object. The invention measures any combination of the above. This invention allows a user to make measurements much faster as compared with a wide variety of outside micrometers that are on the market today. The conventional outside micrometers on the market today utilize a rotary thread spindle system whereby the measurement output is decreased. Due to the complex design of the conventional outside micrometers on the market today, it is not easy to take quick and accurate measurements. And therefore, the measuring efficiency has been low.

2. Brief Description of the Related Art

The field of measurements and specifically to micrometers as used by such persons as drafters, contractors, artisans, architects machinists, etc. are used on a daily basis. Tools for providing accurate measurements of outside lengths, widths, diameters, and heights are absolutely necessary for the completion of jobs in these industries.

Contractors, machinists and architects however, must carry a large amount of other tools and supplies with them during jobs to perform necessary tasks. Any of these persons would be enabled to perform their duties more efficiently if measurements are done more rapidly with increased accuracy, thereby lessening fatigue and thereby increasing work quality.

What is needed in the art is a micrometer that allows a user to make measurements much faster and more accurately as compared with a wide variety of outside micrometers that are on the market today. The present invention satisfies those needs.

SUMMARY OF THE INVENTION

The present invention relates generally to tools of precision measurements, and more particularly to an outside micrometer which accurately and precisely measures either the length, the width, the height, or the diameter of an object. The invention measures any combination of the above. This invention allows user to make measurement much faster as compared with a wide variety of outside micrometers that are on the market today. The conventional outside micrometers on the market today utilize a rotary thread spindle system whereby the measurement output is decreased. Due to the complex design of the conventional outside micrometers on the market today, it is not easy to take quick and accurate measurements. And therefore, the measuring efficiency has been low.

The disadvantages and limitation of the conventional outside micrometers are overcome by the present invention. With this invention, a user can measure an object much more quickly than any conventional outside micrometer. At the same time, the present invention measures work without loss of accuracy. The present invention incorporates the use of linear spindle motion thereby enabling a much faster and more precise travel from the distance of one end to the distance of the second end of the work being measured as compared with conventional rotary thread spindle motion micrometers that exist on the market today.

The conventional outside micrometers existing on the market also utilize a linear sensor digital gauge, whereby the measuring range is limited to a range between fifteen and twenty millimeters. The present invention incorporates a rotary motion sensor capable of increased measurement speeds of up to ten times that of the conventional outside micrometers. Additionally, the measuring range of the present invention is much greater, and is capable of measuring in the range of up to between zero and 200 millimeters.

DESCRIPTION OF PREFERRED EMBODIMENTS

Figure 1:
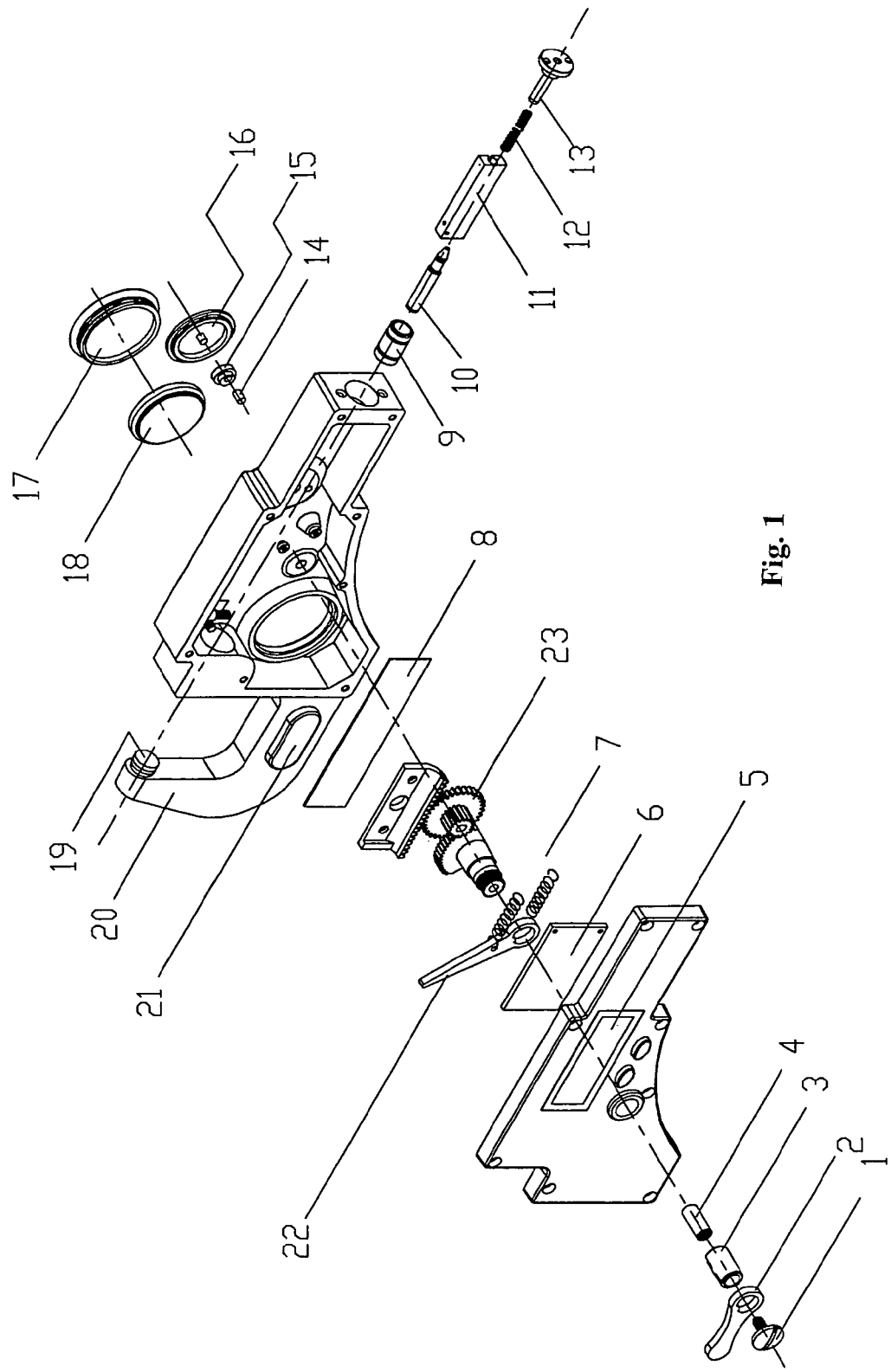
FIG. 1
1. Thimble handle screw
2. Thimble handle
3. Thimble handle motion barrel cover
4. Thimble handle motion barrel
5. Electronic processing and digital display unit
6. linear scale digital sensor
7. Thimble handle retractable spring
8. Linear motion digital sensor
9. Spindle guide track
10. Linear spindle
11. Linear motion digital sensor base
12. Spindle retract spring
13. Guide bar
14. Spindle guide pin
15. Spindle guide screw nut
16. Spindle track screw cover
17. Battery cover
18. Battery
19. Micrometer anvil
20. Micrometer body
21. Anti-Heat plate
22. Thimble handle shift bar
23. Gearing System

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Referring to the drawing figures, like reference numerals designate identical or corresponding elements throughout the several figures.

According to principles of the present invention, the present invention accurately and precisely measures either the length, the width, the height, or the diameter of an object—or any combination of the above. This invention allows a user to make measurement much faster as compared with a wide variety of outside micrometers that are on the market today. The conventional outside micrometers on the market today utilize a rotary thread spindle system whereby the measurement output is decreased. Due to the complex design of the conventional outside micrometers on the market today, it is not easy to take quick and accurate measurements. And therefore, the measuring efficiency has been low.

Still other objects, features, and attendant advantages of the present invention will become apparent to those skilled in the art from a reading of the following detailed description of embodiments constructed in accordance therewith, taken in conjunction with the accompanying drawings.

The present invention includes the following main parts: Electronic processing and digital display unit (5), Linear motion digital sensor/scale (8), Digital/linear scale receiving sensor (6), Micrometer body (20), Linear spindle (10), Micrometer anvil (19), Spindle retract spring (12), Linear motion digital sensor/scale base (11), a Spindle control unit includes (1,2,3,4,7,22), and a Spindle linear movement unit includes (9,10,11,12,13).

In a stationary position, by the force created by Spindle retract spring (12), the Linear spindle (10) is forced to move to the left, which forces the Linear spindle (10) and Micrometer anvil (19) to move close to each other.

By operating the spindle control unit, the Linear spindle (10) will move to the right which moves away from Micrometer anvil (19). At the same time, with the movement of the Spindle linear movement unit, Linear motion digital sensor (8) also moves together with the Spindle linear movement unit. Digital scale receiving sensor (6) collects data and forwards the data to Electronic processing and digital display unit (5). Data is then calculated by the Electronic processing and digital display unit (5), and displays it as readable numerical date.

Thimble handle motion barrel (4) is mounted on the Micrometer body (20). The Spindle control unit includes: Thimble handle screw (1), Thimble handle (2), Thimble handle motion barrel cover (3), Thimble handle motion barrel (4), Thimble handle shift bar (22), Gearing System (23), and Thimble handle retractable spring (7). Thimble handle (2) and Thimble handle shift bar (22) and Gearing System (23), are fixed on and connected by Thimble handle motion barrel cover (3). Thimble handle motion barrel (4) is at inside of Thimble handle motion barrel cover (3). The motion created by the Thimble handle (2) will make rotary movement on Thimble handle motion barrel (4). At the same time, the rotary movement of Thimble handle motion barrel (4) will make Thimble handle shift bar (22) rotate. Thimble handle retractable spring (7) is connected to the Thimble handle shift bar (22), Gearing System (23), and Linear motion digital scale base (11). The movement of Thimble handle shift bar (22) moves Thimble handle retractable spring (7), and therefore moves the Linear motion digital scale base (11). The rear part of the Linear spindle (10) is mounted inside the Linear motion digital scale sensor base (11). And, Linear motion digital sensor (8) is mounted on the surface of the Linear motion digital scale sensor base (11) face toward the Electronic processing and digital display unit (5). Therefore, with the movement of Linear motion digital scale sensor base (11), both the Linear spindle (10) and Linear motion digital sensor (8) move together to the same direction. Digital scale receiving sensor (6) collects data and forwards the data to Electronic processing and digital display unit (5). Data is then calculated by the Electronic processing and digital display unit (5), and displays it as readable numerical date. When the Thimble handle (2) is set free, the force created by Spindle retract spring (12) will move the Linear spindle to its stationary position.

The front portion of the Linear spindle 10 will move through Spindle guide track (9). A slot on the Linear motion digital scale sensor base (11) will move through Spindle guide pin (14). Both the Spindle guide track (9) and Spindle guide pin (14) assure the Linear spindle (10) travel through a linear straight line.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention described by the foregoing includes all changes that come within the meaning, range and equivalence thereof and is intended to be embraced therein.

The invention claimed is:

1. A high-speed measuring electronic digital outside micrometer comprising: a linear motion digital sensor, a linear scale digital sensor, a linear motion digital sensor base, a digital display unit, an electronic processing unit, a micrometer body, a linear spindle with a measuring surface, a spindle linear movement unit, a spindle control unit, a micrometer anvil with measuring surface, and a retractable spring; while in stationary position, the measuring surface of the micrometer anvil and the linear spindle are in closed contact to each other; by operating the spindle control unit, said spindle control unit will create a distance between the micrometer anvil and the linear spindle measuring surface; wherein said distance is a measurable distance of the micrometer, thereby displayed on said digital display unit; by setting free the spindle control unit, the retractable spring will re-set said micrometer to its stationary position whereby reading on said digital display unit displays "0".

2. The high-speed measuring electronic digital outside micrometer of claim 1, further comprising a spindle linear movement unit, electronically coupled to a linear motion digital sensor base and coupled with a spindle guide pin system, whereby said spindle linear movement unit allows the linear spindle to move in the direction away from said measuring surface of said micrometer anvil.

3. The high-speed measuring electronic digital outside micrometer of claim 2, further comprising a retractable spring feature, whereby said spindle linear movement unit allows said linear spindle to move in direction away from said measuring surface of said micrometer anvil, wherein setting free of the spindle control unit, the retractable springs will re-set said micrometer to its stationary position.

4. The high-speed measuring electronic digital outside micrometer of claim 3, further comprising an additional feature of said spindle control unit, whereby said spindle control unit includes a thimble handle and gearing system mounted on the micrometer body cover, further coupled with a thimble handle spring, coupled to the spindle linear movement unit, whereby movement of said thimble handle of said spindle control unit, will thereby cause said spindle linear movement unit to transition position through smooth and steady movements.

5. The high-speed measuring electronic digital outside micrometer of claim 4, further comprising a feature of a linear motion digital sensor system; whereby said linear motion digital sensor system is electronically coupled to a linear motion digital sensor, and a linear scale digital sensor.

6. A high-speed measuring electronic digital outside micrometer comprising: a rotary motion digital sensor, a linear scale digital sensor, a linear motion digital sensor base, a digital display unit, an electronic processing unit, a micrometer body, a linear spindle with a measuring surface a spindle linear movement unit, a spindle control unit, a micrometer anvil with measuring surface, and a retractable spring; while in stationary position, the measuring surface of the micrometer anvil and the linear spindle are in closed contact to each other; by operating the spindle control unit, said spindle control unit will create a distance between the micrometer anvil and the linear spindle measuring surface; wherein said distance is a measurable distance of the micrometer, thereby displayed on said digital display unit; by setting free the spindle control unit, the retractable spring will re-set said micrometer to its stationary position whereby reading on said digital display unit displays "0".

7. The high-speed measuring electronic digital outside micrometer of claim 6, further comprising a spindle linear movement unit, electronically coupled to a linear motion digital sensor base and coupled with a spindle guide pin system, whereby said spindle linear movement unit allows the linear spindle to move in the direction away from said measuring surface of said micrometer anvil.

8. The high-speed measuring electronic digital outside micrometer of claim 7, further comprising a retractable spring feature, whereby said spindle linear movement unit allows said linear spindle to move in direction away from said measuring surface of said micrometer anvil, wherein setting free of the spindle control unit, the retractable springs will re-set said micrometer to its stationary position.

9. The high-speed measuring electronic digital outside micrometer of claim 8, further comprising an additional feature of said spindle control unit, whereby said spindle control unit includes a thimble handle and gearing system mounted on the micrometer body cover, further coupled with a thimble handle spring, coupled to the spindle linear movement unit, whereby movement of said thimble handle of said spindle control unit, will thereby cause said spindle linear movement unit to transition position through smooth and steady movements.

10. The high-speed measuring electronic digital outside micrometer of claim 9, further comprising a feature of a linear motion digital sensor system; whereby said linear motion digital sensor system is electronically coupled to a linear motion digital sensor, and a linear scale digital sensor.

* * * * *